United States Patent
Calahan (10) Patent No.: US 9,111,006 B2
(45) Date of Patent: *Aug. 18, 2015

(54) SYSTEM, METHOD AND COMPUTER PROGRAM PRODUCT FOR COMMUNICATING DATA BETWEEN A DATABASE AND A CACHE

(75) Inventor: Patrick Calahan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 13/049,809

(22) Filed: Mar. 16, 2011

(65) Prior Publication Data

US 2011/0231481 A1    Sep. 22, 2011

Related U.S. Application Data

(60) Provisional application No. 61/314,517, filed on Mar. 16, 2010.

(51) Int. Cl.
*G06F 15/16* (2006.01)
*G06F 17/30* (2006.01)

(52) U.S. Cl.
CPC ...... *G06F 17/30902* (2013.01); *G06F 17/3056* (2013.01)

(58) Field of Classification Search
CPC ............. H04L 41/024; H04L 41/0813; H04L 41/0863; G06F 12/00; G06F 12/08; G06F 17/30292; G06F 17/30607; G06F 17/3056; G06F 17/30581

USPC ............... 707/1, 10, 101, 103, 201, 4; 705/7; 711/118, 141, 135, 202; 709/203, 214, 709/227, 220, 205; 715/205; 717/171

See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,920,725 A * | 7/1999 | Ma et al. | 717/171 |
| 5,963,953 A | 10/1999 | Cram et al. | |
| 6,026,474 A * | 2/2000 | Carter et al. | 711/202 |
| 6,085,198 A * | 7/2000 | Skinner et al. | 1/1 |
| 6,092,083 A | 7/2000 | Brodersen et al. | |

(Continued)

OTHER PUBLICATIONS

U.S. Appl. No. 60/828,192, filed Oct. 4, 2006.
Non-Final Office Action from U.S. Appl. No. 13/802,307, dated May 22, 2014.
Final Office Action from U.S. Appl. No. 13/802,307, dated Nov. 24, 2014.

*Primary Examiner* — Dustin Nguyen
(74) *Attorney, Agent, or Firm* — Zilka-Kotab, PC (57) ABSTRACT

In accordance with embodiments, there are provided mechanisms and methods for communicating data between a database and a cache. These mechanisms and methods for communicating data between a database and a cache can enable improved application quality and performance, enhanced client application interaction, increased system performance, etc.

11 Claims, 8 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,317,761 B1 * | 11/2001 | Landsman et al. | 715/205 |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,769,048 B2 * | 7/2004 | Goldberg et al. | 711/141 |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,366,738 B2 * | 4/2008 | Yorke et al. | 1/1 |
| 7,383,271 B2 * | 6/2008 | Yip et al. | 1/1 |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,634,570 B2 * | 12/2009 | Paya et al. | 709/227 |
| 7,698,160 B2 | 4/2010 | Beaven et al. | |
| 7,970,816 B2 * | 6/2011 | Chess et al. | 709/203 |
| 8,015,495 B2 | 9/2011 | Achacoso et al. | |
| 8,065,484 B2 * | 11/2011 | Iyer et al. | 711/118 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,255,456 B2 * | 8/2012 | Sundarrajan et al. | 709/203 |
| 8,275,836 B2 | 9/2012 | Beaven, Deceased et al. | |
| 8,457,545 B2 | 6/2013 | Chan | |
| 8,484,111 B2 | 7/2013 | Frankland et al. | |
| 2001/0013052 A1 * | 8/2001 | Benjamin et al. | 709/203 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0065899 A1 * | 5/2002 | Smith et al. | 709/214 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0220989 A1 * | 11/2003 | Tsuji et al. | 709/220 |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0044731 A1 * | 3/2004 | Chen et al. | 709/203 |
| 2004/0128001 A1 | 7/2004 | Levin et al. | |
| 2004/0133538 A1 * | 7/2004 | Amiri et al. | 707/1 |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2007/0061327 A1 * | 3/2007 | Oscherov et al. | 707/10 |
| 2008/0249972 A1 | 10/2008 | Dillon | |
| 2009/0024596 A1 * | 1/2009 | Basso et al. | 707/4 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0210270 A1 * | 8/2009 | Quan et al. | 705/7 |
| 2009/0254589 A1 * | 10/2009 | Nair et al. | 707/201 |
| 2010/0180208 A1 | 7/2010 | Kasten et al. | |
| 2010/0325363 A1 * | 12/2010 | Olesen et al. | 711/135 |
| 2013/0218948 A1 | 8/2013 | Jakobson | |
| 2013/0218949 A1 | 8/2013 | Jakobson | |
| 2013/0218966 A1 | 8/2013 | Jakobson | |

\* cited by examiner

SYSTEM, METHOD AND COMPUTER PROGRAM PRODUCT FOR COMMUNICATING DATA BETWEEN A DATABASE AND A CACHE

CLAIM OF PRIORITY

This application claims the benefit of U.S. Provisional Patent Application 61/314,517, entitled "Write-behind caching in Flex of database entities," by Patrick Calahan, filed Mar. 16, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data communication, and more particularly to data communication between a database and a cache.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems commonly utilize resources located within the system to provide system-based services (e.g., applications, etc.) to one or more users. For example, a system may provide a hypertext markup language (HTML) user interface (UI) to users, where the UI utilizes a local database of the system. Unfortunately, such system-based services have been associated with various limitations.

Just by way of example, certain system-based services (e.g., HTML UIs, etc.) may not have the interface flexibility, visual features, or other capabilities of system services that are run from within an internet browser (e.g., Adobe® Flash® applications, etc.). However, techniques are needed to communicate data from the system to the browser-based services. Accordingly, it is desirable to provide techniques that enable efficient and reliable data communication between system databases and browser-based services.

BRIEF SUMMARY

In accordance with embodiments, there are provided mechanisms and methods for communicating data between a database and a cache. These mechanisms and methods for communicating data between a database and a cache can enable improved application quality and performance, enhanced client application interaction, increased system performance, etc.

In an embodiment and by way of example, a method for communicating data between a database and a cache is provided. In one embodiment, a database of a system is identified. Additionally, a cache separate from the database that is associated with an application residing within a browser is identified. Further, data is communicated between the database and the cache.

While one or more implementations and techniques are described with reference to an embodiment in which communicating data between a database and a cache is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for communicating data between a database and a cache.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for communicating data between a database and a cache will be described with reference to example embodiments.

Figure 1:
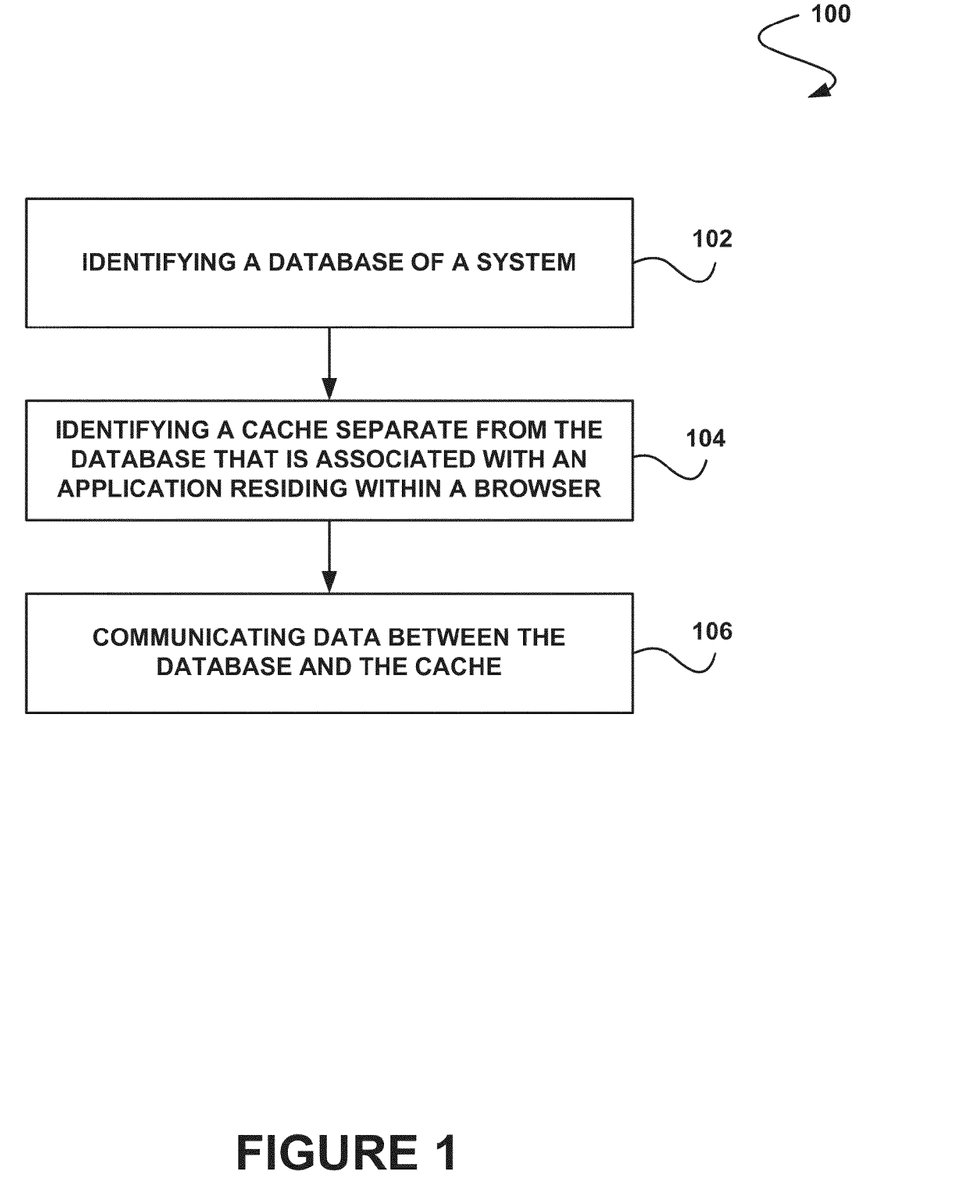
FIG. 1 illustrates a method for communicating data between a database and a cache, in accordance with one embodiment.

FIG. 1 illustrates a method 100 for communicating data between a database and a cache, in accordance with one embodiment. As shown in operation 102, a database of a system is identified. In one embodiment, the system may include a client, a server, a multi-tenant on-demand database system, etc. In another embodiment, the database may include data that is associated with one or more system applications. For example, the database may store one or more objects that are used by one or more applications of the system. In yet another embodiment, metadata may be stored within the database. For example, the database may contain metadata that describes one or more of the objects (e.g., describes one or more properties of an object, one or more fields of an object, the "shape" of an object, etc.) stored within the database.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, a cache separate from the database that is associated with an application residing within a browser is identified. In one embodiment, the application may be associated with the system. For example, the application may be a feature provided by the system. In another embodiment, the application may provide a service or other feature of the system. For example, the application may include a graphical approval process editor that enables customers of the system to add, remove, view, or manipulate one or more approval processes utilizing a visual user interface (UI). In another example, the approval process interface may manage a description of each approval process (e.g., by depicting a visual representation of the approval process, etc.). In yet another example, the approval process may route submitted approval processes through the system.

Further still, in one embodiment, the application may run in a browser (e.g., an end-user's browser, etc.) inside a browser-based application runtime (e.g., Adobe Flash®, etc.). In another embodiment, the application may be created utilizing a software development kit associated with the browser-based application runtime (e.g. Adobe Flex®, etc.). In yet another embodiment, the cache may provide one or more components of the application with data. For example, the cache may include a client-side cache external to the system (e.g., located within the browser, etc.) and may provide one or more interface components of the application with a one or more objects from the database of the system. For instance, the cache may provide the UI components of the graphical approval process editor with a view of objects of the database that comprise an approval process. In yet another embodiment, a network connection may exist between the database and the cache.

Further, as shown in operation 106, data is communicated between the database and the cache. In one embodiment, communicating the data may include sending data from the database to the cache. For example, communicating the data may include retrieving the data (e.g., one or more objects such as approval processes, etc.) from the database, compiling the data into a form recognizable by the application, and sending the data to the cache. In another embodiment, communicating the data may include sending data from the cache to the database. In still another embodiment, communicating the data may include synchronizing data between the cache and the database.

Additionally, in one embodiment, communicating the data may be performed by a cache module (e.g., an application server, etc.). In another embodiment, communicating the data may be performed utilizing an application programming interface (API). For example, an API may be generated utilizing a protocol specification (e.g., simple object access protocol (SOAP), etc.), and the API may retrieve data from the database and may provide it to the cache. See, for example, U.S. patent application Ser. No. 10/870,695, filed Jun. 16, 2004, which is hereby incorporated by reference in its entirety, and which describes exemplary techniques for exposing system database data utilizing SOAP web services.

Further, in one embodiment, one or more descriptions of the data (e.g., metadata, etc.) may be obtained from the database utilizing the protocol specification. For example, the SOAP protocol may utilize an extensible markup language (XML) which may be self-describing and may provide a metadata description associated with the data to the application. Additionally, the one or more descriptions may be stored at the cache.

Further still, in one embodiment, a data dictionary may be utilized to obtain the descriptions of the data retrieved from the database. For example, a universal data dictionary (UDD) may provide metadata associated with the data retrieved from the database. In this way, the UDD may be leveraged to provide metadata descriptions of the retrieved data from the database. Additionally, in one embodiment, the application may utilize the descriptions of the data to perform one or more actions associated with the data. For example, the graphical approval process editor may utilize the metadata provided by the UDD to identify and utilize approval process objects retrieved from the system database.

Also, in one embodiment, the synchronizing may include saving the data in the cache at the object level (e.g., performing object-level caching of the data, etc.). For example, a one-to-one relationship may be maintained between objects stored in the database and objects stored in the cache. In another example, if changes are made to specific objects within the application (e.g., as a result of a user changing the objects utilizing the application, etc.), such changes may be temporarily stored in the cache (which may remember the relationships between data stored therein). Additionally, the specific objects that have been changed may be returned to the database of the system, and those specific objects may then be updated at the system according to the changes made in the cache.

In this way, only the data that has been changed using the application may be sent independently from the rest of the data in the cache back to the database (e.g., instead of a document representing all data within the cache, etc.). Additionally, in one embodiment, one or more individual objects may be retrieved from the database to the cache, thereby resulting in more efficient cache refreshing of individual objects. In another embodiment, data in the cache may be refreshed from the database asynchronously. Additionally, in yet another embodiment, the cache may employ a proxy architecture that may preserve the data identity of data in the cache across refreshes. In still another embodiment, data in the cache may be updated and written back to the database at a time chosen by the application e.g., in response to an end user selecting a "save" icon, etc.).

Further, in one embodiment, a change may be made to data in the database by an entity other than the application. For example, a client running outside of the browser may access data in the database and may perform an out-of-band alteration of the data. Additionally, a copy of the data may also be stored in the cache before it is changed by the entity. In another embodiment, the copy of the data stored in the cache may be automatically updated, in response to the change made by the entity.

For example, a cache representation may be created for a specific object, and code may be created that is attached to that object. Further, if out-of-band updates are made at the server, the state may automatically be changed, and the application may be notified. In this way, out-of-band changes may be automatically accounted for within the cache, thereby increasing performance and preserving data identities.

Figure 2:
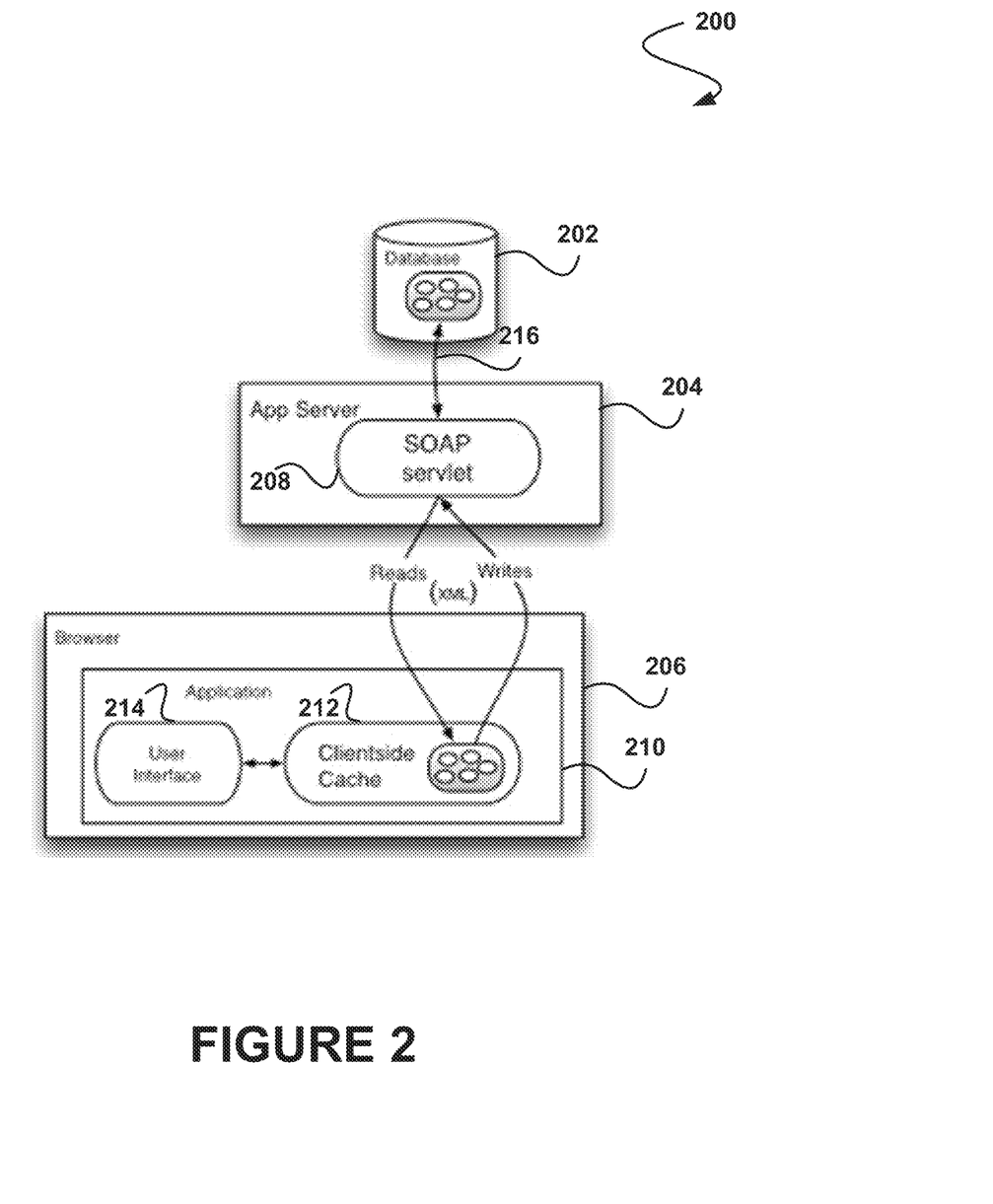
FIG. 2 illustrates an exemplary write-behind caching architecture, in accordance with another embodiment.

FIG. 2 illustrates an exemplary write-behind caching architecture 200, in accordance with another embodiment. As an option, the present architecture 200 may be carried out in the context of the functionality of FIG. 1. Of course, however, the architecture 200 may be carried out in any desired environment. The aforementioned definitions may apply during the present description.

As shown, a system database 202 is in communication with an application server 204 over a network connection 216, where the application server 204 includes a SOAP servlet 208. Additionally, the application server 204 is in communication with a browser environment 206 that includes an application 210. Further, the application 210 includes a client-side cache 212 and a user interface 214. In one embodiment, the application 210 may request data from the database 202 via the SOAP servlet 208 of the application server 204. For example, the application 210 may request data to be displayed in the browser environment 206.

Additionally, in one embodiment, in response to the request received from the application server 204, the database 202 may return the requested data to the application server 204. In another embodiment, the database 202 may also return metadata describing the data to the application server 204. For example, the database 202 may also return to the application server 204 metadata describing the shape of the data (e.g., properties of the data, types of fields of the data, a type of object included within the data, dynamic fields that are included within the data, etc.).

In yet another embodiment, the application server 204 may utilize a data dictionary (e.g. a UDD, etc.) to describe to the application 210 the data and metadata retrieved from the database 202. For example, using the metadata and the data dictionary, the SOAP servlet 208 within the application server 204 may recognize the shape of data objects (e.g., approval process objects, etc.) within the data from the database 202 and may compile the data into a form usable by the application 210. Additionally, the compiled representation of the data that is recognizable by the application 210 may be stored in the client-side cache 212.

Further, in another embodiment, the cache 212 may exist at the bottom of a typical three-tier architecture, and objects in the database may be read by the application 210. In another embodiment, when the application 210 has loaded the database objects, they may be streamed out to the end user's browser 206 via XML, where they may be re-materialized as objects in the cache 212 (e.g., within a Grape application, etc.).

In this way, the metadata and the data dictionary may be leveraged in order to translate the data retrieved from the database 202 such that data and data relationships are described and pertinent entities as well as conditions are identified. As a result, the application 210 may know what to expect when it received the data to properly utilize the data, thereby overcoming the locality of data between the database 202 and the browser environment 206.

Figure 3:
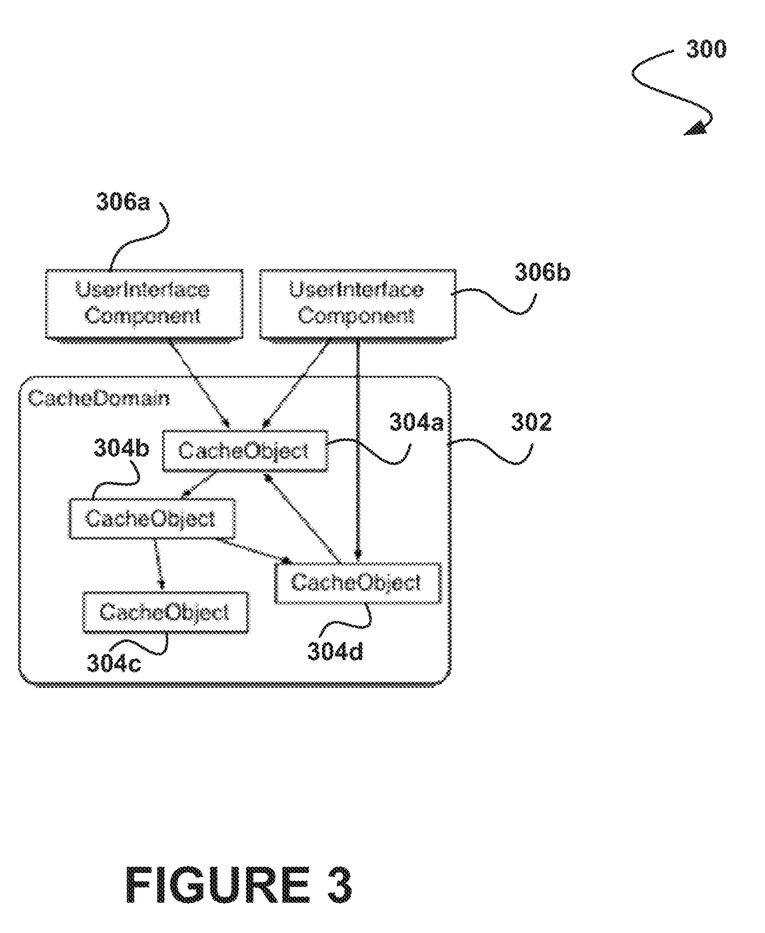
FIG. 3 illustrates an exemplary cache domain environment, in accordance with another embodiment.

FIG. 3 illustrates an exemplary cache domain environment 300, in accordance with another embodiment. As an option, the present environment 300 may be carried out in the context of the functionality of FIGS. 1-2. Of course, however, the environment 300 may be carried out in any desired environment. The aforementioned definitions may apply during the present description.

As shown, a cache domain 302 includes a plurality of cache objects 304a-d. Further, a plurality of user interface components 306a and 306b are in communication with one or more of the cache objects 304a-d within the cache domain 302. In one embodiment, the cache domain may include the organizing structure of the cache of an application running within a browser environment. In another embodiment, the cache objects 304a-d may provide a single, coherent view of a portion of data located in a separate system database. In yet another embodiment, the cache domain 302 may provide services by which cache objects 304a-d are created, refreshed, destroyed, made discoverable to the user interfaces 306a-b, etc.

Additionally, in one embodiment, client applications may only have need of a single cache domain 302 which may exist for the life of the application instance. In another embodiment, code components in the user interfaces 306a-b may be free to refer to and interact with one or more cache objects 304a-d as they might any model objects in a typical model-view-controller architecture. In yet another embodiment, cache objects 304a-d are also free to refer to other cache objects 304a-d.

Figure 4:
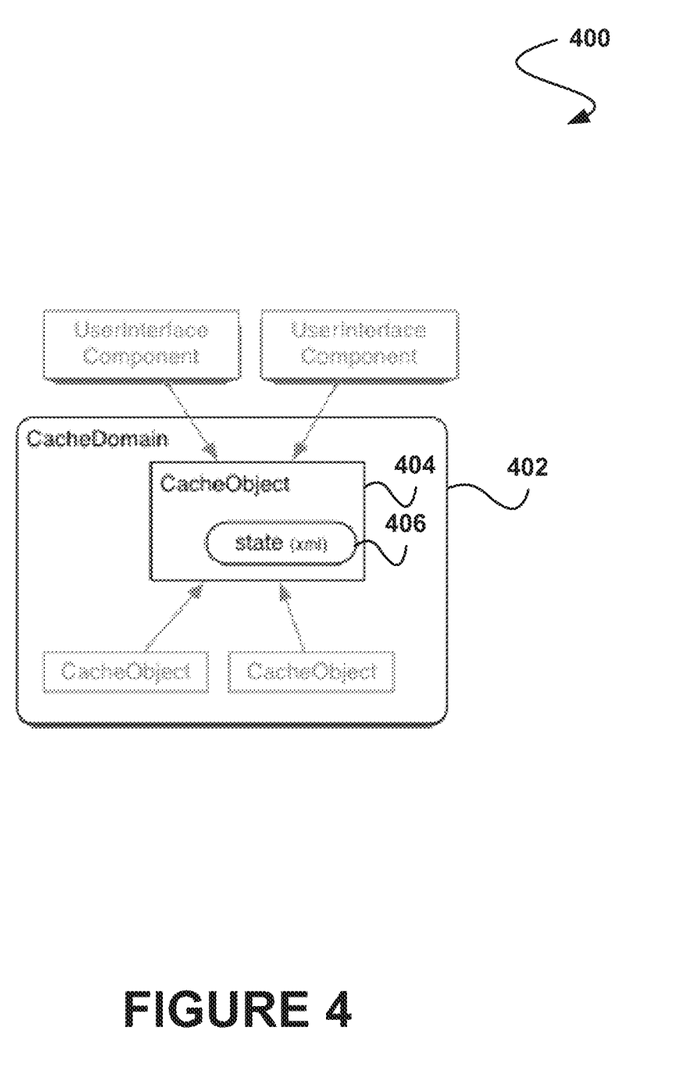
FIG. 4 illustrates an exemplary environment where a cache object is used as a wrapper for XML information, in accordance with another embodiment.

FIG. 4 illustrates an exemplary environment 400 where a cache object is used as a wrapper for XML information, in accordance with another embodiment. As an option, the present environment 400 may be carried out in the context of the functionality of FIGS. 1-3. Of course, however, the environment 400 may be carried out in any desired environment. The aforementioned definitions may apply during the present description.

As shown, a cache domain 402 includes a cache object 404 which serves as a proxy to a wrapped bit of state 406. In one embodiment, the wrapped bit of state 406 may be retrieved from a server or other system. In another embodiment, the wrapped bit of state 406 may include a simple struct that represent pieces of the XML payload and which may be code generated from a web service definition language (WSDL) of a protocol (e.g., SOAP, etc.).

Additionally, in one embodiment, the cache state 406 may be updated asynchronously while maintaining object identity. For example, references to and among cache object 404 and other cache objects may remain valid after the read.

Figure 5:
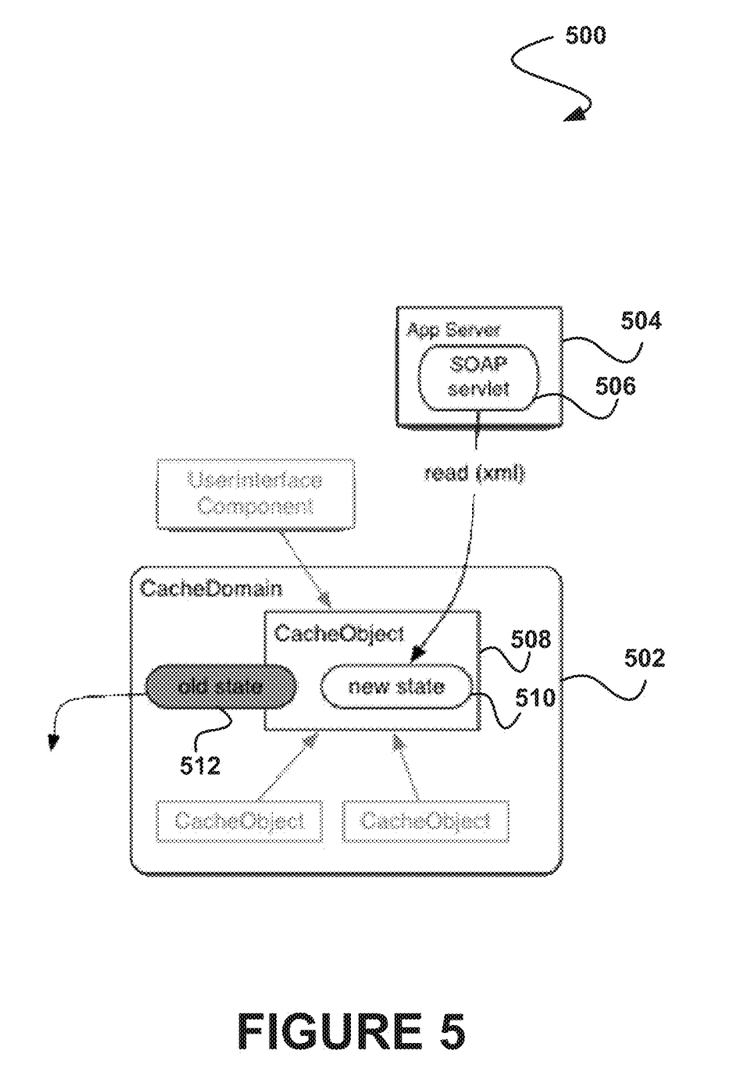
FIG. 5 illustrates an exemplary environment where a cached state is refreshed from a server, in accordance with another embodiment.

FIG. 5 illustrates an exemplary environment 500 where a cached state is refreshed from a server, in accordance with another embodiment. As an option, the present environment 500 may be carried out in the context of the functionality of FIGS. 1-4. Of course, however, the environment 500 may be carried out in any desired environment. The aforementioned definitions may apply during the present description.

As shown, a cache domain 502 containing a cache object 508 is in communication with an application server 504 that includes a SOAP servlet 506. In one embodiment, when a read to the cache domain 502 is triggered, a new version of an xml state 510 is received from a server via the application server 504 and injected into the cache object 508. In another embodiment, the old state 512 may be discarded. In this way, a state of the cache object 508 may be effectively updated "in place."

Additionally, in one embodiment, UI components which may need to refer to some object in the data model may do so by object reference rather than by utilizing an identifier. Further, when the cache read happens, the UI components may not have to go back into the cache to look up the new version of the model object, since the object they were already pointing at may be updated in place. In this way, the design of UI code may be significantly simplified, objects may be refreshed in the cache at will (such as with asynchronous polling, etc.).

Figure 6:
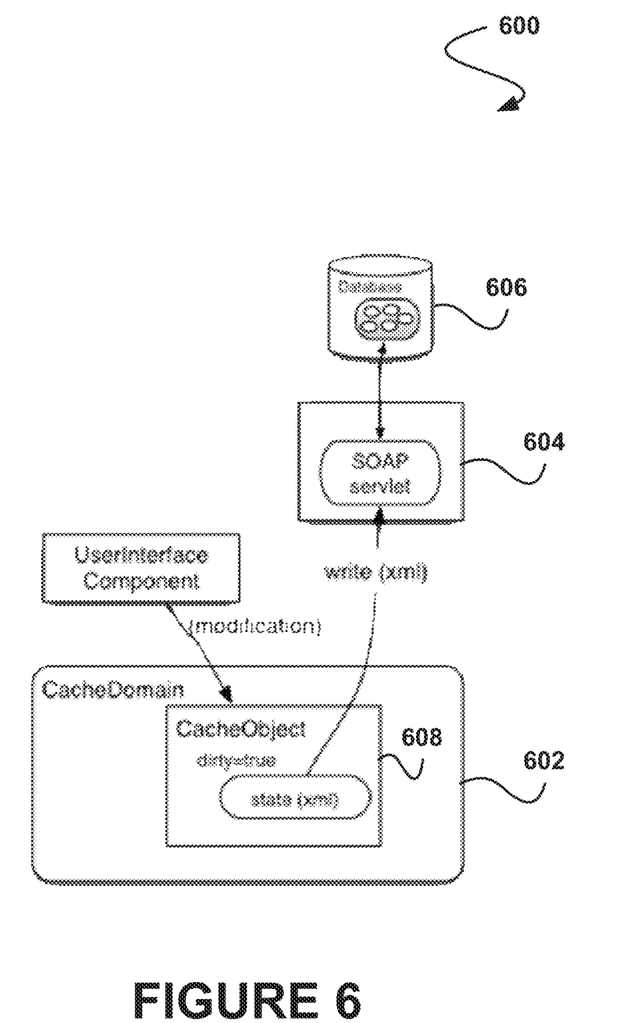
FIG. 6 illustrates another exemplary environment for refreshing a cached state from a server, in accordance with another embodiment.

FIG. 6 illustrates another exemplary environment 600 for refreshing a cached state from a server, in accordance with another embodiment. As an option, the present environment 600 may be carried out in the context of the functionality of FIGS. 1-5. Of course, however, the environment 600 may be carried out in any desired environment. The aforementioned definitions may apply during the present description.

As shown, a cache domain 602 of an application that contains a cache object 608 is in communication with a database 606 of a system via an app server 504. In one embodiment, when the cache object 608 is changed (e.g., as a result of end user action in a user interface, etc.), it may be marked "dirty" and may be scheduled for write-back to the database 606. For example, at a time of the application's choosing (e.g, in response to user events, the firing of an asynchronous tinier, etc.), the "dirtied" cache object 608 may be pushed back to the database 606 of the server via XML and may be written to the database 606.

In another embodiment, "stale writes" may be detected via an optimistic concurrency mechanism. For example, update timestamps may be maintained in the cache domain 602 and may be compared with timestamps in the database 606.

System Overview

Figure 7:
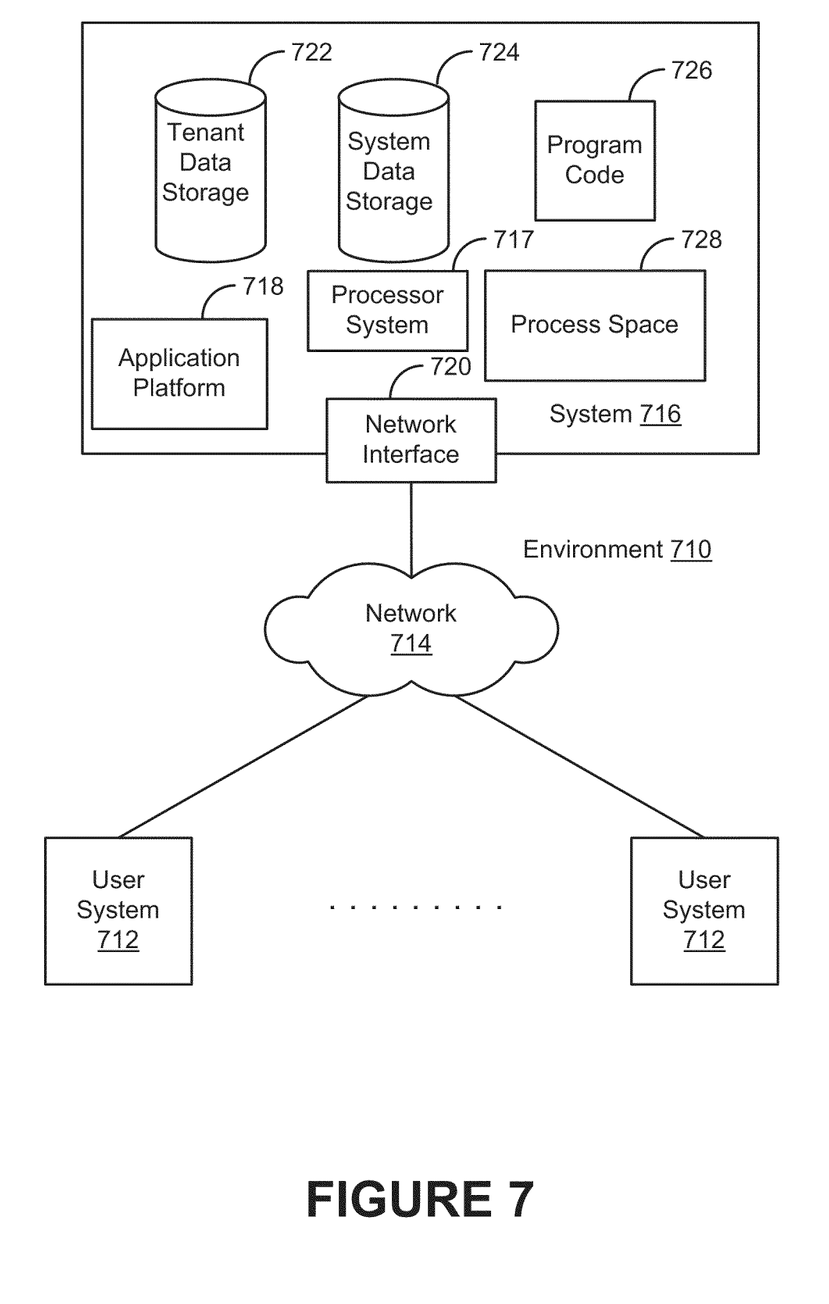
FIG. 7 illustrates a block diagram of an example of an environment wherein an on-demand database system might be used.

FIG. 7 illustrates a block diagram of an environment 710 wherein an on-demand database system might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database system exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database system, which is system 716.

An on-demand database system, such as system 716, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database system 716 may include an application platform 718 that enables creation, managing and executing one or more applications developed by the provider of the on-demand database system, users accessing the on-demand database system via user systems 712, or third party application developers accessing the on-demand database system via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, hut may not have access to certain applications, database information, and data accessible by a user at a higher permission level. Thus, different users have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application (s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
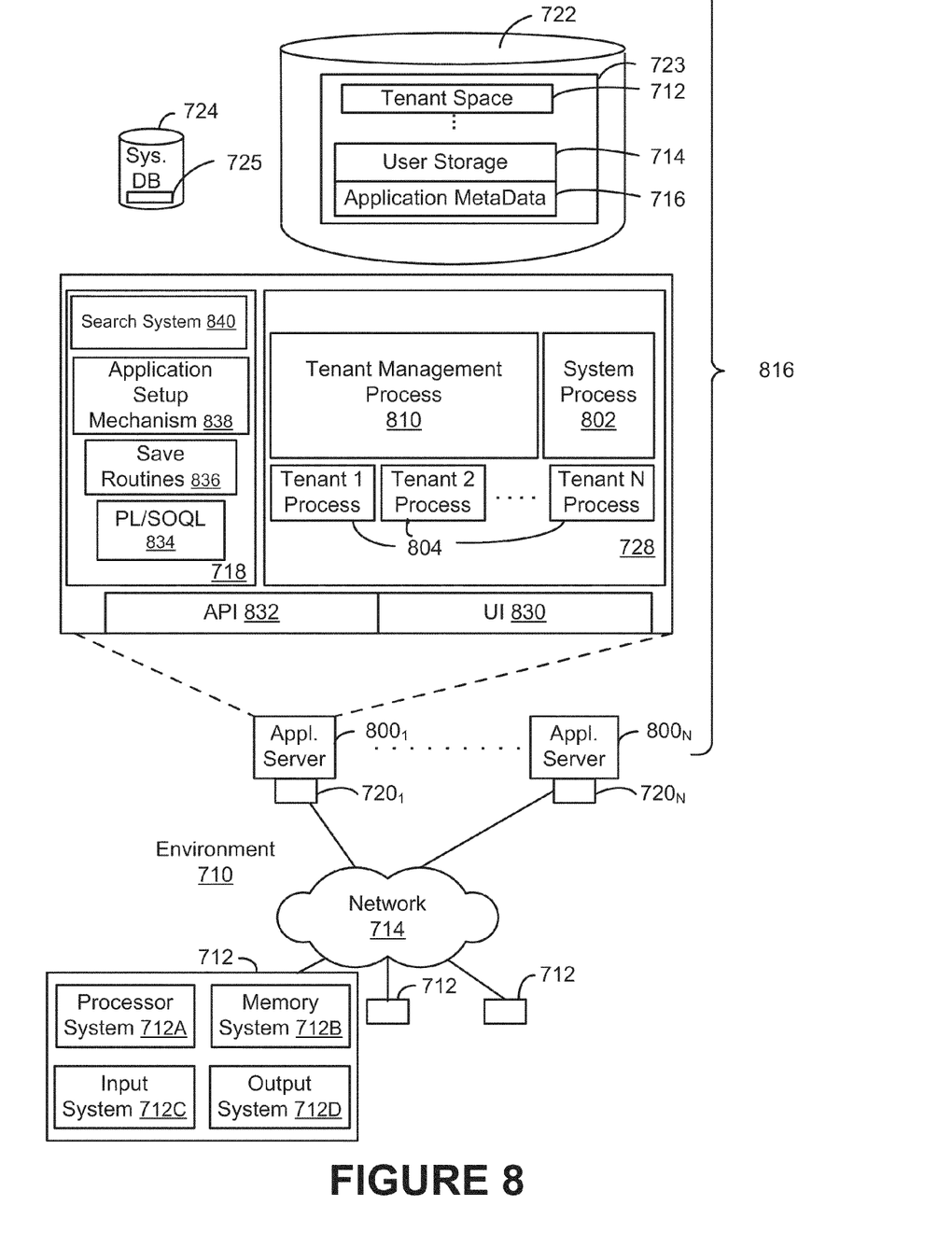
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate.

Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for communicating data between a database and a cache, the method comprising:
   identifying a database of a system;
   associating a cache separate from the database with an application residing within a browser;
   retrieving an object stored in the database in response to a request for the object;
   retrieving metadata describing the object from the database;
   storing the retrieved object and metadata in the cache;
   providing the object and the metadata from the cache to the application;
   identifying a change made to the metadata stored in the cache, the change in the metadata being made by a user utilizing the application; and
   asynchronously updating the metadata stored in the database according to the identified change.

2. The computer program product of claim 1, wherein the application is a feature provided by the system.

3. The computer program product of claim 1, wherein the application includes a graphical approval process editor that enables customers of the system to add, remove, view, or manipulate one or more approval processes utilizing a visual user interface.

4. The computer program product of claim 3, wherein the approval process interface manages a description of each approval process.

5. The computer program product of claim 1, wherein the cache includes a client-side cache external to the system.

6. The computer program product of claim 1, wherein the cache provides one or more interface components of the application with the object from the database of the system.

7. The computer program product of claim 3, wherein the cache provides user interface (UI) components of the graphical approval process editor with a view of objects of the database that comprise an approval process.

8. The computer program product of claim 1, wherein a network connection exists between the database and the cache.

9. A method, comprising:
   identifying a database of a system;
   associating a cache separate from the database with an application residing within a browser;
   retrieving an object stored in the database in response to a request for the object;
   retrieving metadata describing the object from the database;
   storing the retrieved object and metadata in the cache;
   providing the object and the metadata from the cache to the application;
   identifying a change made to the metadata stored in the cache, the change in the metadata being made by a user utilizing the application; and
   asynchronously updating the metadata stored in the database according to the identified change.

10. An apparatus, comprising:
    a processor for:
    identifying a database of a system;
    associating a cache separate from the database with an application residing within a browser;
    retrieving an object stored in the database in response to a request for the object;

retrieving metadata describing the object from the database;

storing the retrieved object and metadata in the cache;

providing the object and the metadata from the cache to the application;

identifying a change made to the metadata stored in the cache, the change in the metadata being made by a user utilizing the application; and asynchronously updating the metadata stored in the database according to the identified change.

11. A method for transmitting code for use in a multi-tenant database system on a transmission medium, the method comprising:

transmitting code for identifying a database of a system;

transmitting code for associating a cache separate from the database with an application residing within a browser;

transmitting code for retrieving an object stored in the database in response to a request for the object;

transmitting code for retrieving metadata describing the object from the database;

transmitting code for storing the retrieved object and metadata in the cache;

transmitting code for providing the object and the metadata from the cache to the application;

transmitting code for identifying a change made to the metadata stored in the cache, the change in the metadata being made by a user utilizing the application; and asynchronously updating the metadata stored in the database according to the identified change.

\* \* \* \* \*